(12) United States Patent
Tanami et al.

(10) Patent No.: US 12,223,055 B2
(45) Date of Patent: Feb. 11, 2025

(54) SYSTEM AND METHOD FOR PERFORMING HIERARCHICAL AND INCREMENTAL WORKLOAD SCANNING

(71) Applicant: CHECK POINT SERVERLESS SECURITY LTD., Tel Aviv (IL)

(72) Inventors: Ohad Tanami, Old City Jerusalem (IL); Itay Harush, Jerusalem (IL)

(73) Assignee: CHECK POINT SERVERLESS SECURITY LTD., Tel Aviv (IL)

( * ) Notice: Subject to any disclaimer, the term of this patent is extended or adjusted under 35 U.S.C. 154(b) by 287 days.

(21) Appl. No.: 17/835,066

(22) Filed: Jun. 8, 2022

(65) Prior Publication Data
US 2023/0401319 A1     Dec. 14, 2023

(51) Int. Cl.
*G06F 21/55* (2013.01)
*G06F 21/54* (2013.01)
*G06F 21/56* (2013.01)
*G06F 21/57* (2013.01)

(52) U.S. Cl.
CPC .......... *G06F 21/577* (2013.01); *G06F 21/54* (2013.01); *G06F 21/554* (2013.01); *G06F 21/568* (2013.01)

(58) Field of Classification Search
CPC ........ G06F 21/577; G06F 21/57; G06F 21/50; G06F 21/54; G06F 21/554; G06F 21/55; G06F 21/568; G06F 21/566; G06F 21/56; G06F 21/60; H04L 63/105; H04L 63/107; H04L 63/10; H04L 63/1408; H04L 63/1425; H04L 63/14
See application file for complete search history.

(56) References Cited

U.S. PATENT DOCUMENTS

| | | | |
|---|---|---|---|
| 2017/0103212 A1* | 4/2017 | Deng | G06F 3/0619 |
| 2017/0109536 A1* | 4/2017 | Stopel | G06F 21/577 |
| 2020/0082094 A1* | 3/2020 | Mcallister | G06F 8/77 |
| 2021/0173935 A1* | 6/2021 | Ramasamy | G06F 21/577 |
| 2023/0021414 A1* | 1/2023 | Kumar | G06F 21/577 |

* cited by examiner

*Primary Examiner* — Kevin Bechtel
*Assistant Examiner* — Sayeda Salma Nahar
(74) *Attorney, Agent, or Firm* — Renner, Otto, Boisselle & Sklar, LLP

(57) ABSTRACT

A computer executed method is presented for identifying security issues in a workload. The method identifies instance(s) of the workload and scans each instance for security vulnerabilities using hierarchical and incremental scanning. The hierarchical and incremental scan of each instance is performed by identifying as a base machine image a machine image that has previously been scanned for security vulnerabilities and that the instance originated from. The differences between the instance and the base machine image are then identified and scanned for security vulnerabilities.

20 Claims, 4 Drawing Sheets

*FIG. 5*
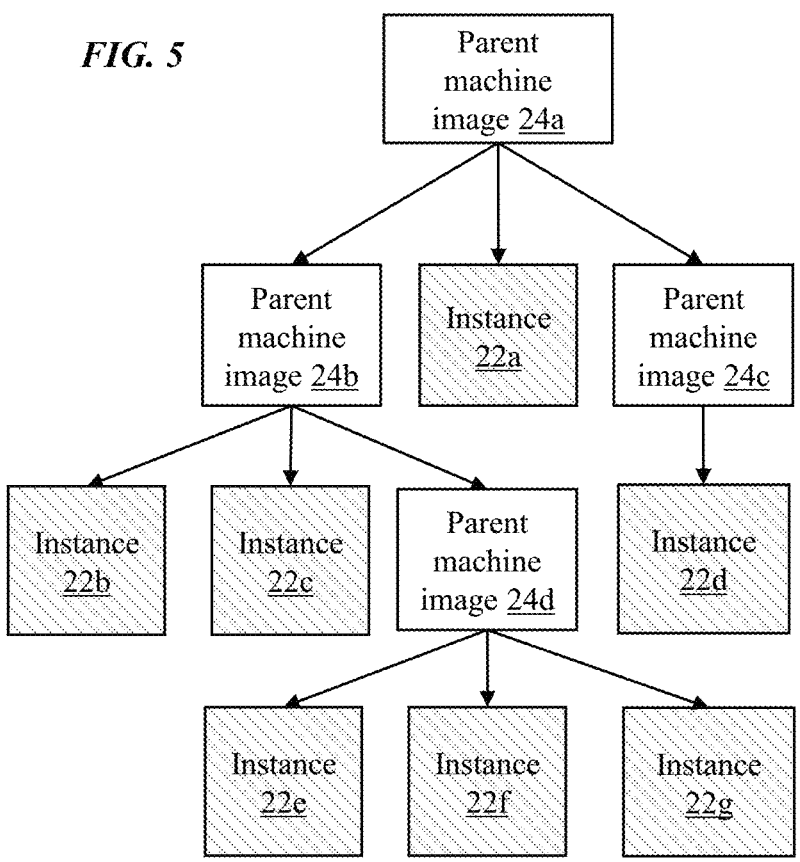
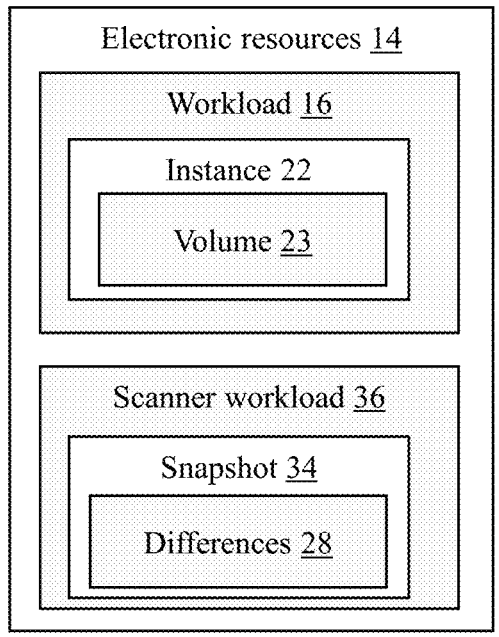
*FIG. 6*
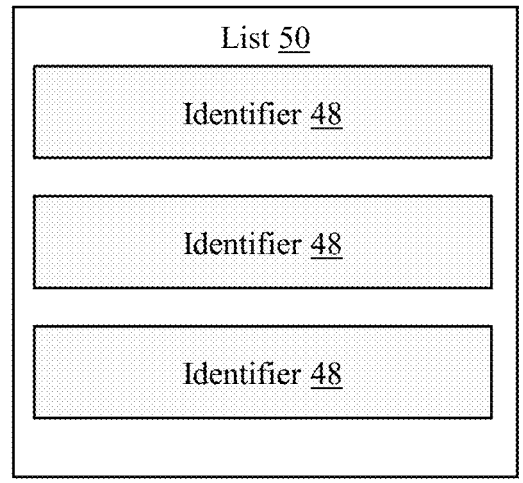
*FIG. 7*

SYSTEM AND METHOD FOR PERFORMING HIERARCHICAL AND INCREMENTAL WORKLOAD SCANNING

TECHNICAL FIELD

The present disclosure relates generally to cloud computing and more particularly to identifying security vulnerabilities in workloads.

BACKGROUND

Currently available cloud computing infrastructure allows individuals and companies to outsource their computing needs, resulting in reduced costs, improved availability, improved scalability, and reduced time to deploy new applications. The companies providing these cloud computing resources function as managed service providers that rent virtual computer, storage, and Internet connectivity services for variable periods on a pay-per-use basis from large pools of re-purposable and multi-tenant computing resources (e.g., Amazon Web Services®, Amazon EC2®, GoGrid®, Joyent®, and Mosso®).

While there are many sources of cloud computing infrastructure available, there is a need for improved security, control, and manageability of these resources. These problems prevent many businesses from maximizing their use of cloud infrastructure, which includes virtual server instances, storage, and Internet bandwidth.

SUMMARY

The present disclosure provides a method for hierarchical and incremental scanning of workload instances to identify security issues by identifying a previously scanned anchor image that the instance originated from, and scanning the differences between the instance and the anchor image for security issues.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

FIG. 5 is a schematic diagram of an exemplary relationship between instances and machine images.

FIG. 6 is a schematic diagram of an exemplary embodiment of a scanner workload and a snapshot of a workload.

FIG. 7 is a schematic diagram of an exemplary embodiment of a list of previously scanned machine images.

Figure 1:
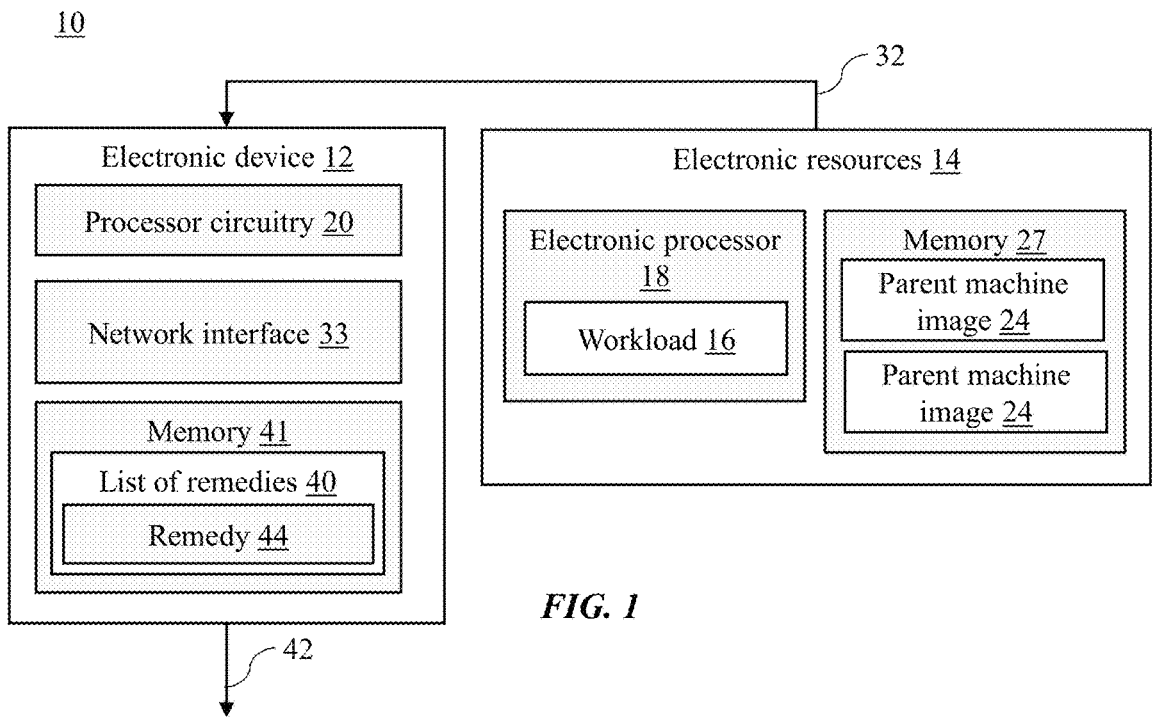
FIG. 1 is a schematic diagram of a general embodiment of a system for performing hierarchical and incremental scanning to identify security issues.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

According to a general embodiment, a processor circuitry executed method is presented for identifying security issues in a workload. The method identifies instance(s) of the workload and scans each instance for security vulnerabilities using hierarchical and incremental scanning. The hierarchical and incremental scan of each instance is performed by identifying as a base machine image a machine image that has previously been scanned for security vulnerabilities and that the instance originated from. The differences between the instance and the base machine image are then identified and scanned for security vulnerabilities.

Figure 2:
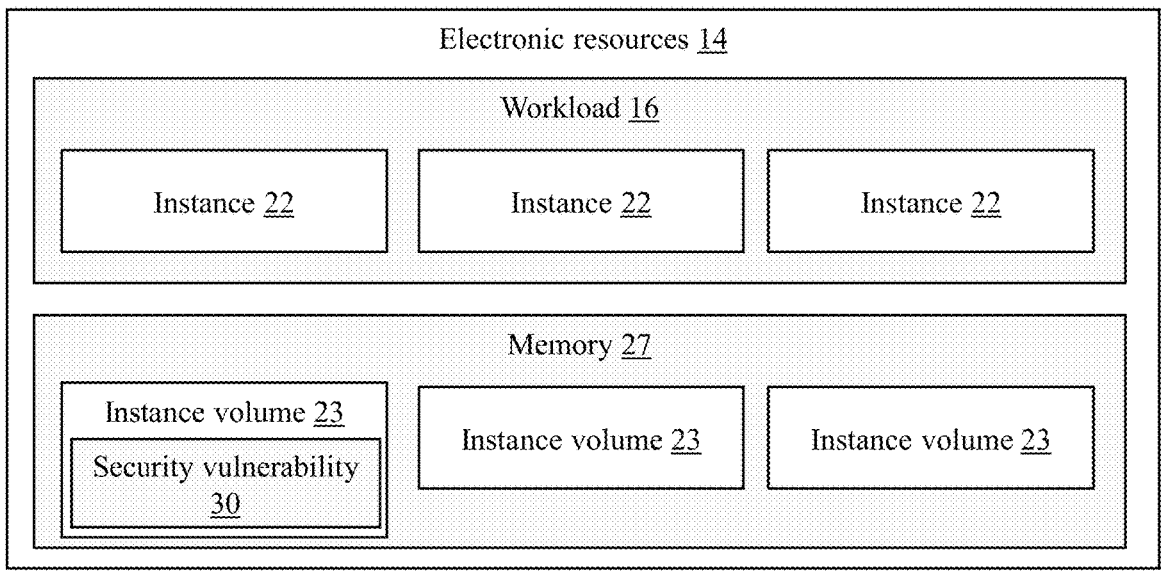
FIG. 2 is a schematic diagram of electronic resources including multiple instances.

Turning to FIGS. 1 and 2, a system 10 is shown for performing hierarchical and incremental scanning to identify security issues (also referred to as security vulnerabilities). The system 10 includes an electronic device 12 and electronic resources 14 that execute a workload 16. The electronic resources 14 includes an electronic processor (also referred to as a computer processor) 18 that executes the workload 16. The electronic device 12 includes processor circuitry 20 that identifies instance(s) 22 of the workload 16. For each of the identified instances 22, the processor circuitry 20 performs hierarchical and incremental scanning of a volume 23 of the instance 22. During hierarchical and incremental scanning of the volume 23 of an instance 22, the processor circuitry 20 identifies as parent machine images 24 one or more machine images that the instance 22 originated from.

Figure 3:
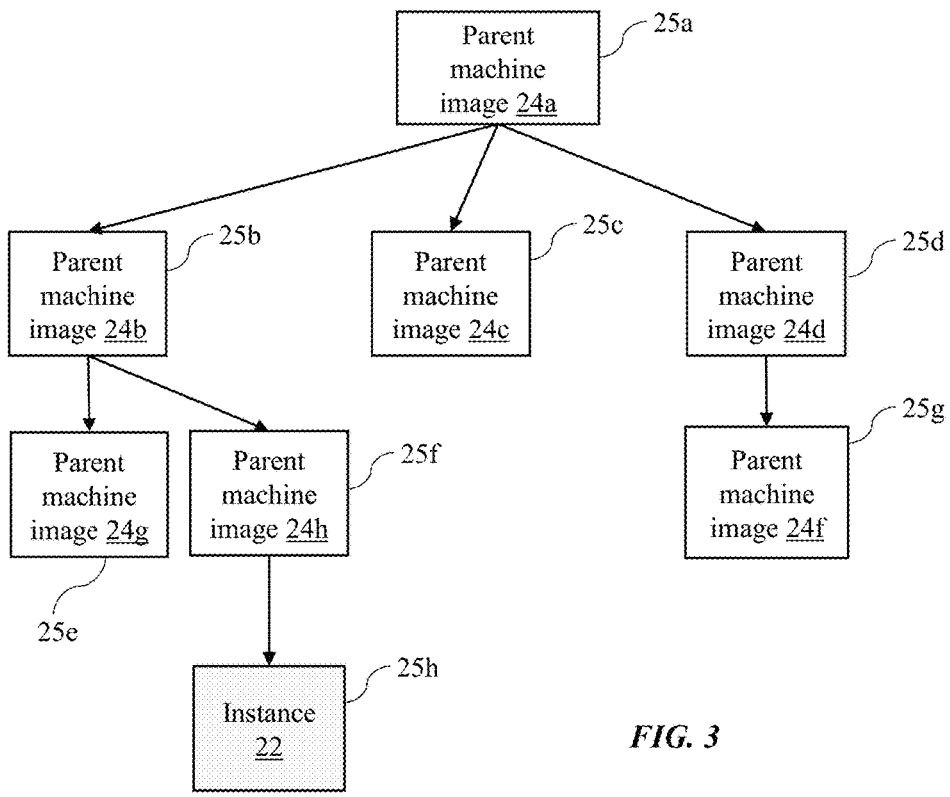
FIG. 3 is a schematic diagram of parent machine images and an instance as a set of related and connected nodes having a hierarchical tree structure.

With exemplary reference to FIG. 3, the parent machine images 24 and the instance 22 have a hierarchical tree structure as a set of related and connected nodes 25. Each of the nodes 25 represents one of the parent machine images 24 or the instance. Each of the nodes 25 is connected to one or more child nodes as a parent node and/or connected to a parent node of as a child node. Child nodes originated from the corresponding parent node. For example, in FIG. 3, node 25a is a parent node to nodes 25b, 25c, 25d. Similarly, node 25b is a parent to nodes 25e, 25f; node 25d is a parent node to node 25e; and node 25f is a parent node to node 25h (the instance 22).

During hierarchical and incremental scanning of the volume 23 of an instance 22, the processor circuitry 20 also determines from the parent machine images 24 a base machine image 26 by identifying from amongst the parent machine images 24 a parent machine image 24 (1) that has previously been scanned and (2) that is most closely related to the instance 22 according to the hierarchical tree structure. For example, in FIG. 3, if machine images 24*b* and 24*g* have been scanned and machine image 24*h* has not been scanned, then machine image 24*b* would be identified as the base machine image 26. That is, the most closely related machine image 24*h* to the instance 22 has not been scanned and, for this reason, is not the base machine image 26. Also, machine image 24*g* is not hierarchically related to the instance 22.

An instance 22 may originate from a machine image 24 by initiating the instance 22 from the machine image 24, such that contents 29 of the machine image 24 are duplicated into the volume 23 of the instance 22. As another example, an instance 22 may originate from a machine image 24 by the instance 22 continuing to run and accumulate differences between the volume 23 of the instance 22 at a current time and the volume 23 of the instance 22 at a previous time (e.g., a previous time point at which the volume 23 was scanned for security vulnerabilities). In this example, the volume 23 of the instance 22 at the previous time may be considered a parent machine image 24. The machine image 26 or a representation of the machine image (e.g., a description of the contents of the machine image 26) may be stored in a memory 27 of the electronic resources 14.

The processor circuitry 20 identifies differences between the instance 22 and the base machine image 26 and scans these identified differences 28 for security vulnerabilities 30. When security vulnerabilities 30 are identified in the scanned differences 28, the processor circuitry 20 issues a notification 32 based on the identified security vulnerabilities 30.

By scanning the differences 28 between the instance 22 and a previously scanned base machine image 26, the system 10 may reduce the amount of memory that needs to be scanned (e.g., reducing the time and/or cost of the scan). For example, if the volume 23 of an instance 22 (also referred to as the file system for the instance 22) is 2 GB, but the differences 28 between the previously scanned base machine image 26 and the volume 23 is 0.5 GB, then the processor circuitry 20 may only scan 0.5 GB. In this example, the processor circuitry 20 may scan only one quarter of the machine image 24 (i.e., the differences 28) as opposed to the entire volume 23. This reduction in memory volume size scanned by the processor circuitry 20 may decrease the resources, time, and/or cost required to scan instances 22 for security vulnerabilities 30.

To determine the differences 28 between the instance 22 and the base machine image 26, the volume 23 of the instance 22 (i.e., the machine image of the instance 22) may be compared to the base machine image 26. The comparison of the instance 22 to the base machine image 26 to determine the differences may be performed using tools included in the electronic resources 14.

The electronic resources 14 may be any suitable cloud-computing platform (also referred to as software as a service (SaaS) or platform as a service (PaaS)), such as Amazon Elastic Compute Cloud (EC2) or Docker. The electronic device 12 may communicate with the electronic resources 14 via a network interface 33. In one embodiment the workload 16 is an EC2 instance and the parent machine images 24 are Amazon Machine Images (AMIs). In another embodiment each instance 22 is a container and the parent machine images 24 are docker images.

Figures 4A, 4B, 4C:
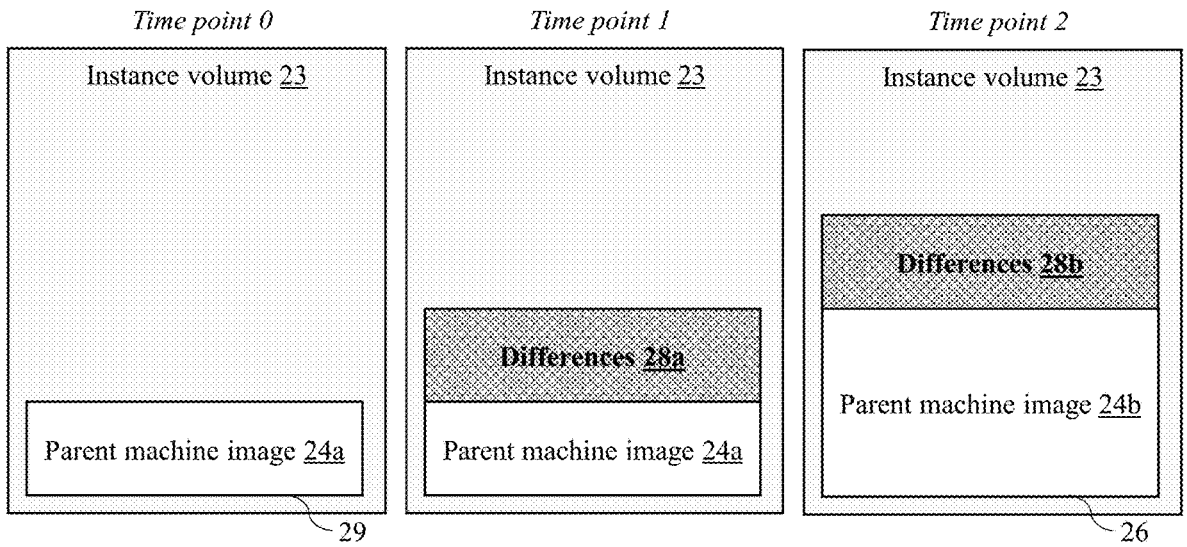
FIGS. 4A, 4B, and 4C are schematic diagrams depicting differences in an instance volume at three time points.

The machine images 24 (also referred to as parent machine images) may be any suitable immutable storage of information capable of being used to execute an instance 22. As shown in FIG. 4A, upon initiation of the instance 22 (i.e., at time point 0), the volume 23 of the instance 22 matches the machine image 24*a* used to initialize the instance 22 (i.e., the volume 23 includes the contents 29 of the machine image 24*a*). As shown in FIG. 4B, at a later time point (i.e., time point 1) after running of the instance 22 for a period of time, the volume 23 has been modified to include differences 28*a* from the machine image 24*a* at time point 0 in FIG. 4A. For example, the volume 23 of the instance 22 may be modified to store data (e.g., applications) in addition to the contents 29 (also referred to as data) of the machine image 24 used to initiate the instance 22. In this example, at the later time point following initialization shown in FIG. 4B, the volume 23 for the instance 22 now differs from the machine image 26 due to the addition of this data. At time point 1, the volume 23 may be scanned for vulnerabilities.

Turning to FIG. 4C, at a time point (i.e., time point 2) following FIG. 4B, further differences 28*b* have been made to the volume 23. At this time point, the instance 22 has two parent machine images 24*a*, 24*b* (i.e., the volume 23 shown in FIG. 4B at time point 0 and the volume shown in FIG. 4A at time point 1). Because the volume 23 was scanned in FIG. 4B, parent machine image 24*b* is the base machine image 26 to the volume 23 (i.e., the most recent scanned parent machine image). Again, because the volume 23 was scanned at time point 1 in FIG. 4B, the differences 28*b* (as opposed to the entire volume 23) may be scanned at time point 2 in FIG. 4C.

When there is not a parent machine image 24 that has previously been scanned for security vulnerabilities, the processor circuitry 20 may scan the volume 23 of the instance 22 for security vulnerabilities 30. Once the scan has been completed, the volume 23 at this time point may be used as a parent machine image 24 for instances 22 (e.g., the same instance at a later time or new instances originated from the parent machine image 24).

In one embodiment, the workload 16 is a dynamic workload. In this embodiment, the electronic resources 14 (e.g., the electronic processor 18) may dynamically scale a number of instances 22 of the dynamic workload 16 based on demand for the dynamic workload 16. The dynamic workload 16 may be scaled, such that increased demand for the workload 16 results in a creation of new instances 22 of the dynamic workload 16. Similarly, the dynamic workload 16 may be scaled, such that decreased demand results in a termination of existing instances 22 of the dynamic workload 16.

The electronic resources 14 may dynamically add instances 22 of the workload 16 (also referred to as autoscaling) to adjust the amount of computational resources available based on demand (e.g., increasing or decreasing automatically based on the number of active users). Because demand may change dramatically throughout the course of the day and each instance 22 costs resources (e.g., money) to run even while idle, resource utilization may be optimized by using "just enough" instances 22 to support the current load while still being able to support sudden and large spikes in activity.

When dealing with dynamically created instances, the number of instances to scan for security vulnerabilities may increase dramatically. For example, an exemplary depiction of dynamically created instances 22 is shown in FIG. 5 as a tree. A parent machine image 24*a* is shown as the root of the tree. In FIG. 5, new instance 22*a* was originated from parent machine image 24*a* and instances that resulted in parent machine images 24*b* and 24*c*. For example, the volumes 23 for instance 22b and 22d may have been scanned at a first time point and this scan may have generated parent machine image 24b and 24c. Following this scan, parent machine image 24b may have been used to originate instance 22c and 22e. Instance 22e may have then been scanned to generate parent machine image 24d, that was later used to originate instances 22f and 22g.

With continued reference to FIG. 5, if the machine images 24a, 24b, and 24c have previously been scanned, a hierarchical and incremental scan of the instances 22a-22g may be performed using these parent machine images 24a-24c. That is, the differences between instance 22b and 22c from parent machine image 24b, respectively, may be scanned. Similarly, the differences between instance 22a and parent machine image 24a may be scanned. The differences between instance 22d and parent machine image 24d may also be scanned. Additionally, the differences between instances 22e, 22f, and 22g, and machine image 24d, respectively, may be scanned. By performing hierarchical and incremental scanning in this way, the total amount of memory scanned can be significantly reduced.

In the embodiment shown in FIG. 6, the processor circuitry 20 scans the identified differences 28 for the security vulnerabilities 30 by causing the workload 16 to generate a snapshot 34 of the instance 22. For example, the electronic resources 14 may generate a machine image 24 (e.g., a copy of the volume 23) of the instance 22. The processor circuitry 20 causes the generated snapshot 34 to attached to a scanner workload 36 (e.g., executed by the electronic processor 18), such that the scanner workload 36 has a same file system as the workload 16 being scanned. The scanner workload 36 then scans the identified differences 28 in the generated snapshot 34 for the security vulnerabilities 30, such that operation of the workload 16 is not impacted. For example, if the instance 22 were scanned instead of a snapshot 34 of the instance 22, then execution of the workload 16 (e.g., slowdown of the instance 22) may be slowed down by the scan. By scanning the snapshot 34 using a scanner workload 36, the workload 16 may continue to operate without impediment due to the scan.

The security vulnerabilities 30 may include any form of potential security issue, such as at least one of security vulnerabilities, secret keys, malicious files, malicious IP addresses, or malicious URLs.

As described above, upon identifying security vulnerability(ies) 30 during a scan, the system 10 may issue a notification 32. The system 10 (e.g., via the processor circuitry 20, electronic processor 18, or an additional computer processor) may compare the issued notifications 32 to a list of remedies to known security vulnerabilities 40. For example, the list of remedies 40 may be stored in a memory 41 of the electronic device 12. The system 10 may also generate a report 42 including remedies 44 associated with the identified security vulnerabilities 30.

For example, if the scan identifies a security vulnerability 30 associated with an unapplied security patch, the report 42 may include a remedy 44 to download and install the security patch. The electronic resources 14 may be configured to apply the remedies 44 in the report 42 to address any identified security vulnerabilities 30. For example, the remedies 44 (also referred to as remedial security measures) may be specific security products that are implemented on instances 22 including the security vulnerabilities 30.

In one embodiment, the system 10 repeatedly performs the hierarchical and incremental scanning for each identified instance 22 based on a run time of the instance 22. For example, each instance 22 may be scanned every 24 hours of run time. In this example, an instance 22 that is created and terminated within 23 hours may not be scanned because it does not meet the 24-hour run time requirement for scanning.

In one embodiment, the system 10 scans each instance 22 once per duration of time (e.g., once per day). The system 10 may stagger scanning of the instances 22 throughout the day to meet this scanning goal.

In one embodiment, instances 22 are scanned by the system based on a priority of each instance in a queue. For example, the instances 22 may be ordered in a queue based on a run time of the instance since last scanned. When an instance 22 is not being scanned by the system, the system 10 may check the highest priority instance 22 in the queue. If the highest priority instance 22 has a run time of greater than a predetermined duration of time (e.g., at least 18 hours), then the highest priority instance 22 in the queue may be scanned. Once this queue has been scanned, the instance 22 may be placed back in the queue based on its priority (e.g., towards the bottom of the queue because the run time since last scanned is zero). When the system 10 is not scanning an instance 22 (i.e., because it just finished scanning an instance 22), the system 10 may again check if the highest priority instance 22 in the queue has a run time since last scan of greater than the predetermined duration of time. In this way, the system 10 may scan the instances 22 after the instances 22 have run a sufficient amount of time (e.g., giving the instance 22 enough time to have obtain a security vulnerability) without overwhelming the system 10 by attempting to scan multiple instance 22 simultaneously.

In the above description, the system 10 is described as scanning one instance 22 at a time. The system 10 may also be configured to scan multiple instances 22 simultaneously (e.g., depending on the compute resources available to the system 10). Similarly, the system 10 is not limited to prioritizing instances 22 for scanning based on run time since last scan. Rather, the queue may be prioritized using any suitable characteristic (e.g., based on applications included in the machine image of the instance 22, user assigned priority, etc.).

In the embodiment shown in FIG. 7, the processor circuitry 20 determines whether a machine image 24 has been previously scanned by comparing an identifier 48 of the machine image to a list 50 of previously scanned machine images. The identifier 48 may be determined based on any unique identifier of a machine image 24. Alternatively or additionally, the machine images 24 may be modified to include an identifier (e.g., a flag or Boolean) specifying whether the machine image 24 has been previously scanned.

The processor circuitry 20 may determine a parent machine image 24 for an instance 22 using any suitable method or procedure. For example, the electronic resources 14 may include tools for performing this determination. In one embodiment, the instance 22 may include an identifier of a parent machine image 24.

The processor circuitry 20 (and electronic processor 18) may have various implementations. For example, the processor circuitry 20 may include any suitable device, such as one or more of processors (e.g., CPUs), programmable circuits, integrated circuits, memory and I/O circuits, application specific integrated circuits, microcontrollers, complex programmable logic devices, other programmable circuits, or the like. The processor circuitry 20 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the processor circuitry 20. The processor circuitry 20 may be communicatively coupled to the computer readable medium and network interface through a system bus, mother board, or using any other suitable structure known in the art.

The computer readable medium (memory) 27, 41 may be, e.g., one or more of a buffer, a flash memory, a hard drive, a removable media, a volatile memory, a non-volatile memory, a random-access memory (RAM), or other suitable device. In a typical arrangement, the memory 27, 41 may include a non-volatile memory for long term data storage and a volatile memory that functions as system memory for the processor. The memory 27, 41 may exchange data with the circuitry over a data bus. Accompanying control lines and an address bus between the memory 27, 41 and the circuitry also may be present. The memory 27, 41 may be considered a non-transitory computer readable medium.

The network interface 33 may comprise a wireless network adaptor, an Ethernet network card, or any suitable device that provides an interface for communicating with the electronic resources 14. The network interface 33 may be communicatively coupled to the memory, such that the network interface 33 is able to send data stored on the memory across the network and store received data on the memory. The network interface 33 may also be communicatively coupled to the processor circuitry such that the circuitry is able to control operation of the network interface 33. The network interface 33, memory, and circuitry may be communicatively coupled through a system bus, mother board, or using any other suitable manner as will be understood by one of ordinary skill in the art.

Figure 8:
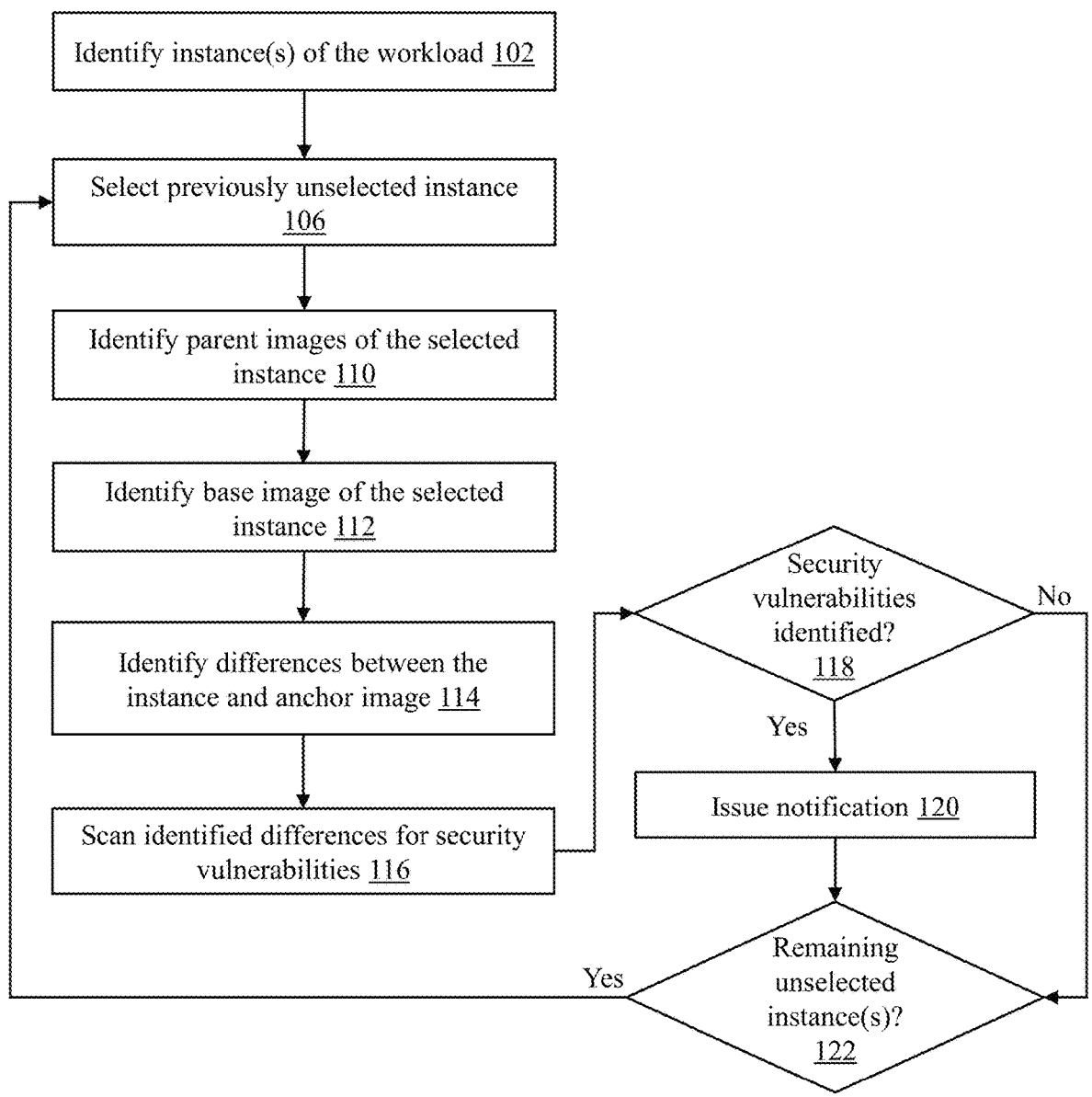
FIG. 8 is a flow diagram depicting an embodiment of a method executed by processor circuitry for performing hierarchical and incremental scanning to identify security issues in a workload executed using a set of electronic resources.

Turning to FIG. 8, a method 100 executed by processor circuitry 20 is shown for performing hierarchical and incremental scanning to identify security issues in a workload 16 executed using electronic resources 14. In step 102, the processor circuitry 20 identifies at least one instance 22 of the workload 16. In step 106, one of the identified instances 22 is selected for hierarchical and incremental scanning. In step 110, parent machine image 24 that the selected instance 22 originated from are identified. As described above, the parent machine images 24 and the instance 22 have a hierarchical tree structure as a set of related and connected nodes, where each of the nodes represents either one of the parent machine images or the instance. In step 112, a base machine image 26 is determined from the parent machine images 24 as the parent machine image 24 that: (1) has previously been scanned to identify security vulnerabilities, and (2) is most closely related to the instance according to the hierarchical tree structure. In step 114, differences 28 between the instance 22 and the base machine image 26 are identified. In step 116, the differences 28 are scanned for security vulnerabilities. In step 118, a check is performed to determine if security vulnerabilities 30 were identified by the scan. If yes, then a notification 42 is issued in step 120 based on the identified security vulnerabilities. If not, then processing moves to step 122. In step 122, a check is performed to determine if any of the identified instances 22 have not yet been selected for scanning. If there remain unselected instances 22, then processing returns to step 106. In this way, each of the identified instance(s) 22 are scanned.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method executed by processor circuitry for performing hierarchical and incremental scanning to identify security issues in a workload executed using a set of electronic resources, the method comprising:
   identifying with the processor circuitry at least one instance of the workload;
   for each of the identified at least one instance, using the processor circuitry to perform hierarchical and incremental scanning by:
   identifying as parent machine images one or more machine images that the instance originated from, wherein:
      the parent machine images and the instance have a hierarchical tree structure as a set of related and connected nodes;
      each of the nodes in the hierarchical tree structure represents one of the parent machine images or the instance;
      a volume of the instance includes the entire content of each identified parent machine image, wherein a volume of each identified parent machine image includes at least a portion of the volume of the instance; and
      each of the nodes in the hierarchical tree structure is at least one of:
         connected to one or more child nodes of the nodes in the hierarchical tree structure as a parent node, such that the one or more child nodes originated from the parent node; or
         connected to a parent node of the nodes in the hierarchical tree structure as a child node, such that the child node originated from the parent node;
   determining from the parent machine images a base machine image by identifying from amongst the parent machine images a parent machine image that:
      has previously been scanned to identify security vulnerabilities; and
      is most closely related to the instance according to the hierarchical tree structure;
   identifying differences between a-the volume of the instance and the content of the base machine image;
   scanning the identified differences for security vulnerabilities; and when security vulnerabilities are identified in the differences, issuing a notification based on the identified security vulnerabilities.

2. The method of claim 1, wherein the scanning of the identified differences for the security vulnerabilities is performed by the processor circuitry:
causing the workload to generate a snapshot of the volume of the instance;
attaching the generated snapshot to a scanner workload, such that the scanner workload has a same file system as the workload; and
causing the scanner workload to scan the identified differences in the generated snapshot for the security vulnerabilities, such that operation of the workload is not impacted.

3. The method of claim 1, further comprising:
comparing the issued notifications to a list of remedies to known security vulnerabilities;
generate a report including remedies associated with the identified security vulnerabilities.

4. The method of claim 1, further comprising for each of the identified at least one instance, repeatedly performing the hierarchical and incremental scanning based on a run time of the instance.

5. The method of claim 1, wherein the determining by the processor circuitry of whether the identified base machine image has been previously scanned is performed by comparing an identifier of the base machine image to a list of previously scanned machine images.

6. The method of claim 1, wherein the security vulnerabilities include at least one of security vulnerabilities, secret keys, malicious files, malicious IP addresses, or malicious URLs.

7. The method of claim 1, wherein the workload is an EC2 instance and the base machine image is an Amazon Machine Image (AMI).

8. The method of claim 1, wherein the base machine image is a docker image.

9. A system for performing hierarchical and incremental scanning to identify security vulnerabilities comprising:
electronic resources configured to execute a dynamic workload, wherein:
the electronic resources include memory and an electronic processor;
the electronic processor is configured to dynamically scale a number of instances of the dynamic workload based on demand for the dynamic workload and to execute the instances of the dynamic workload, such that:
increased demand results in a creation of new instances of the dynamic workload; and
decreased demand results in a termination of existing instances of the dynamic workload;
processor circuitry configured to:
identify at least one instance of the dynamic workload;
for each of the identified at least one instance, perform hierarchical and incremental scanning by:
identifying as parent machine images one or more machine images that the instance originated from, wherein:
the parent machine images and the instance have a hierarchical tree structure as a set of related and connected nodes;
each of the nodes in the hierarchical tree structure represents one of the parent machine images or the instance;
a volume of the instance includes the entire content of each identified parent machine image, wherein a volume of each identified parent machine image includes at least a portion of the volume of the instance; and
each of the nodes in the hierarchical tree structure is at least one of:
connected to one or more child nodes of the nodes in the hierarchical tree structure as a parent node, such that the one or more child nodes originated from the parent node; or
connected to a parent node of the nodes in the hierarchical tree structure as a child node, such that the child node originated from the parent node;
determining from the parent machine images a base machine image by identifying from amongst the parent machine images a parent machine image that:
has previously been scanned to identify security vulnerabilities; and
identifying differences between the volume of the instance and the content of the base machine image;
scanning the identified differences for security vulnerabilities; and
when security vulnerabilities are identified in the differences, issuing a notification based on the identified security vulnerabilities.

10. The system of claim 9, wherein the scanning of the identified differences for the security vulnerabilities is performed by the processor circuitry:
causing the workload to generate a snapshot of the volume of the instance;
attaching the generated snapshot to a scanner workload, such that the workload has a same file system as the workload; and
causing the scanner workload to scan the identified differences in the generated snapshot for the security vulnerabilities, such that operation of the workload is not impacted.

11. The system of claim 9, wherein the processor circuitry is further configured to:
compare the issued notifications to a list of remedies to known security vulnerabilities; and
generate a report including remedies associated with the identified security vulnerabilities.

12. The system of claim 9, wherein the processor circuitry is further configured to, for each of the identified at least one instance, repeatedly perform the hierarchical and incremental scanning based on a run time of the instance.

13. The system of claim 9, wherein the processor circuitry is configured to determine whether the identified base machine image has been previously scanned by comparing an identifier of the base machine image to a list of previously scanned machine images.

14. The system of claim 9, wherein the security vulnerabilities include at least one of security vulnerabilities, secret keys, malicious files, malicious IP addresses, or malicious URLs.

15. An electronic device for performing hierarchical and incremental scanning to identify security vulnerabilities in a workload executed using a set of electronic resources, the electronic device comprising:
a network interface configured to communicate with the set of electronic resources;

processor circuitry configured to:
- identify at least one instance of the workload;
- for each of the identified at least one instance, perform hierarchical and incremental scanning by:
  - identifying as parent machine images one or more machine images that the instance originated from, wherein:
    - the parent machine images and the instance have a hierarchical tree structure as a set of related and connected nodes;
    - each of the nodes in the hierarchical tree structure represents one of the parent machine images or the instance;
    - a volume of the instance includes the entire content of each identified parent machine image, wherein a volume of each identified parent machine image includes at least a portion of the volume of the instance; and
    - each of the nodes in the hierarchical tree structure is at least one of:
      - connected to one or more child nodes of the nodes in the hierarchical tree structure as a parent node, such that the one or more child nodes originated from the parent node; or
      - connected to a parent node of the nodes in the hierarchical tree structure as a child node, such that the child node originated from the parent node;
  - determining from the parent machine images a base machine image by identifying from amongst the parent machine images a parent machine image that:
    - has previously been scanned to identify security vulnerabilities; and
    - identifying differences between the volume of the instance and the content of the base machine image;
  - scanning the identified differences for security vulnerabilities; and
  - when security vulnerabilities are identified in the differences, issuing a notification based on the identified security vulnerabilities.

16. The electronic device of claim 15, wherein the scanning of the identified differences for the security vulnerabilities is performed by the processor circuitry:
- causing the workload to generate a snapshot of the volume of the instance;
- attaching the generated snapshot to a scanner workload, such that the workload has a same file system as the workload; and
- causing the scanner workload to scan the identified differences in the generated snapshot for the security vulnerabilities, such that operation of the workload is not impacted.

17. The electronic device of claim 15, wherein the processor circuitry is further configured to:
- compare the issued notifications to a list of remedies to known security vulnerabilities; and
- generate a report including remedies associated with the identified security vulnerabilities.

18. The electronic device of claim 15, wherein the processor circuitry is further configured to, for each of the identified at least one instance, repeatedly perform the hierarchical and incremental scanning based on a run time of the instance.

19. The electronic device of claim 15, wherein the processor circuitry is configured to determine whether the identified base machine image has been previously scanned by comparing an identifier of the base machine image to a list of previously scanned machine images.

20. The electronic device of claim 15, wherein the security vulnerabilities include at least one of security vulnerabilities, secret keys, malicious files, malicious IP addresses, or malicious URLs.

* * * * *